United States Patent
Schnös et al.

(10) Patent No.: US 11,498,219 B2
(45) Date of Patent: Nov. 15, 2022

(54) METHOD FOR CONTROLLING AN END ELEMENT OF A MACHINE TOOL, AND A MACHINE TOOL

(71) Applicant: Siemens Aktiengesellshaft, Munich (DE)

(72) Inventors: Florian Ulli Wolfgang Schnös, Munich (DE); Dirk Hartmann, Aßling (DE); Birgit Obst, Munich (DE); Utz Wever, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 351 days.

(21) Appl. No.: 16/320,590

(22) PCT Filed: Jul. 10, 2017

(86) PCT No.: PCT/EP2017/067182
§ 371 (c)(1),
(2) Date: Jan. 25, 2019

(87) PCT Pub. No.: WO2018/019550
PCT Pub. Date: Feb. 1, 2018

(65) Prior Publication Data
US 2019/0152064 A1  May 23, 2019

(30) Foreign Application Priority Data
Jul. 26, 2016 (DE) .......................... 102016213663.1

(51) Int. Cl.
*B25J 9/00* (2006.01)
*B25J 9/16* (2006.01)
*G05B 19/401* (2006.01)

(52) U.S. Cl.
CPC ........ *B25J 9/1697* (2013.01); *G05B 19/4015* (2013.01); *G05B 2219/37555* (2013.01); *G05B 2219/39045* (2013.01)

(58) Field of Classification Search
CPC ............... B25J 9/1697; G05B 19/4015; G05B 2219/37555; G05B 2219/39045
See application file for complete search history.

(56) References Cited

U.S. PATENT DOCUMENTS 8,346,392 B2 * 1/2013 Walser ................... B25J 9/1697
700/259
2003/0123945 A1 7/2003 Lutz et al.
(Continued)

FOREIGN PATENT DOCUMENTS

CN 1805830 A 7/2006
DE 10250326 A1 5/2003
(Continued)

OTHER PUBLICATIONS

Examination Report in corresponding European Patent Application No. 17745129.1 dated Nov. 5, 2020. 7 pages.
(Continued)

*Primary Examiner* — Ian Jen
(74) *Attorney, Agent, or Firm* — Schmeiser, Olsen & Watts LLP (57) ABSTRACT

Provided is a method for the computerized control of an end element of a machine tool. The method includes a method step of sensing a plurality of optical markers in a work environment of the machine tool by means of an optical measuring system. The method includes a method step of determining a first relative pose between the end element and a workpiece on the basis of the plurality of sensed optical markers. The method includes a method step of determining a first correction value on the basis of a comparison of the first relative pose with a reference pose. The
(Continued)

method includes a method step of controlling the end element for machining the workpiece taking the first correction value into consideration.

19 Claims, 3 Drawing Sheets

(56) References Cited

U.S. PATENT DOCUMENTS

| | | | |
|---|---|---|---|
| 2004/0077939 A1 | 4/2004 | Graumann | |
| 2004/0254677 A1 | 12/2004 | Brogardh et al. | |
| 2005/0107920 A1 | 5/2005 | Ban et al. | |
| 2005/0131582 A1 | 6/2005 | Kazi et al. | |
| 2005/0171553 A1 | 8/2005 | Pott et al. | |
| 2008/0201016 A1 | 8/2008 | Finlay | |
| 2008/0300723 A1* | 12/2008 | Ban | G05B 19/4083 901/3 |
| 2009/0250445 A1 | 10/2009 | Yamaguchi et al. | |
| 2010/0256960 A1 | 10/2010 | Ortmaier et al. | |
| 2012/0027545 A1* | 2/2012 | Marx | G05B 19/401 700/250 |
| 2014/0088762 A1* | 3/2014 | Iida | G05B 19/404 700/253 |
| 2016/0151915 A1 | 6/2016 | Nishi et al. | |

FOREIGN PATENT DOCUMENTS

| | | |
|---|---|---|
| DE | 10237724 A1 | 3/2004 |
| DE | 10239673 A1 | 3/2004 |
| DE | 10249786 A1 | 5/2004 |
| DE | 10251829 A1 | 5/2004 |
| DE | 10345743 A1 | 5/2005 |
| DE | 102007055205 A1 | 5/2009 |
| DE | 602004013107 T2 | 7/2009 |
| DE | 102010006504 A1 | 8/2011 |
| DE | 102010025601 A1 | 1/2012 |
| DE | 102014011852 A1 | 3/2015 |
| DE | 102015015094 A1 | 6/2016 |
| EP | 1308239 A2 | 5/2003 |
| EP | 2319655 A1 | 5/2011 |
| JP | H07266268 A | 10/1995 |
| JP | 2004523295 A | 8/2004 |
| JP | 2005149299 A | 6/2005 |
| JP | 2008544795 A | 12/2008 |
| JP | 2009508137 A | 2/2009 |
| JP | 2011502672 A | 1/2011 |
| JP | 2014226754 A | 12/2014 |
| WO | 2014012628 A1 | 1/2014 |
| WO | 2015024600 A1 | 2/2015 |
| WO | 2014020739 A1 | 7/2016 |

OTHER PUBLICATIONS

Office Action in related Japanese Patent Application No. 2019-503905, dated Mar. 24, 2020. 16 pages.
PCT International Search Report dated Nov. 22, 2017 and corresponding to PCT International Application No. PCT/EP2017/067182 filed on Jul. 22, 2017.
Non-English German National Search Report for application No. 2016P14036DE dated Jul. 4, 2017.
Extended European Search Report in corresponding European Patent Application No. 17 745 129.1 dated Nov. 5, 2020. 7 pages.
Office Action in related Chinese Patent Application No. 201780059463.7 dated Jul. 7, 2021. 9 pages.

* cited by examiner

METHOD FOR CONTROLLING AN END ELEMENT OF A MACHINE TOOL, AND A MACHINE TOOL

CROSS-REFERENCE TO RELATED APPLICATIONS

This application claims priority to PCT Application No. PCT/EP2017/067182, having a filing date of Jul. 10, 2017, based off of German Application No. 10 2016 213663.1, having a filing date of Jul. 26, 2016, the entire contents both of which are hereby incorporated by reference.

FIELD OF TECHNOLOGY

The following relates to a machine tool and to a method for controlling an end element of a machine tool.

BACKGROUND

The precise production of workpieces using CNC machines requires in particular the relative position and orientation between the workpiece and the tool to be measured during the machining process. By way of example, static, dynamic and process-dependent forces arise during the machining of the workpiece that effect the machine structure. These lead in particular to deformation of and stimulation of vibrations in the machine structure and hence, by way of example, to a local movement between tool and workpiece. Furthermore, changes of temperature in the machine structure can likewise lead to movement of the relative pose between the tool and the workpiece, for example. It is known practice, by way of example, to determine the pose between tool and workpiece indirectly via position sensors in the kinematic axes of the machine, for example. In particular geometric differences in the individual machine components lead to errors that cannot be taken into consideration for determining the relative pose between tool and workpiece using this conventional approach.

SUMMARY

An aspect relates to providing a method and a machine tool that allow an end element to be controlled with the highest possible accuracy.

According to a first aspect, the embodiments of the invention relate to a method for the computer-aided control of an end element of a machine tool, having the following method steps:

- detecting multiple optical markers in a work environment of the machine tool by means of an optical measuring system;
- ascertaining a first relative pose between the end element and a workpiece on the basis of the multiple detected optical markers;
- ascertaining a first correction value on the basis of a comparison of the first relative pose with a reference pose;
- controlling the end element for working on the workpiece taking into consideration the first correction value.

Unless indicated otherwise in the description that follows, the terms "perform", "calculate", "computer-aided", "compute", "establish", "generate", "configure", "reconstruct" and the like preferably refer to actions and/or processes and/or processing steps that change and/or generate data and/or that convert data into other data, the data being able to be presented or available in particular as physical variables, for example as electrical impulses. In particular, the expression "computer" should be interpreted as broadly as possible in order to cover in particular all electronic devices having data processing properties. Computers can therefore be personal computers, servers, handheld computer systems, pocket PC devices, mobile radios and other communication devices that can process data on a computer-aided basis, processors and other electronic devices for data processing, for example.

"Computer-aided" can be understood within the context of the embodiments of the invention to mean an implementation of the method in which in particular a processor carries out at least one method step of the method, for example.

A processor can be understood within the context of the embodiments of the invention to mean a machine or an electronic circuit, for example. A processor can in particular be a main processor (central processing unit, CPU), a microprocessor or a microcontroller, for example an application-specific integrated circuit or a digital signal processor, possibly in combination with a memory unit for storing program instructions, etc. A processor can, by way of example, also be an IC (integrated circuit), in particular an FPGA (field programmable gate array) or an ASIC (application-specific integrated circuit), or a DSP (digital signal processor). A processor can also be understood to mean a virtualized processor or a soft CPU. By way of example, it can also be a programmable processor equipped with configuration steps for carrying out said method according to the embodiments of the invention or configured using configuration steps such that the programmable processor implements the inventive features of the method, of the component, of the security module, or of other aspects and subaspects of the embodiments of the invention.

A "memory unit" can be understood within the context of the embodiments of the invention to mean a memory in the form of main memory (random access memory, RAM) or a hard disk, for example.

A "module" can be understood within the context of the embodiments of the invention to mean a processor and/or a memory unit for storing program instructions, for example. By way of example, the processor is specifically configured to execute the program instructions such that the processor performs functions in order to implement the method according to the embodiments of the invention or a step of the method according to the invention.

A "work environment", in particular of a robot, can be understood within the context of the embodiments of the invention to mean a movement space of the robot and/or a workspace of the robot, for example. The movement space describes in particular a space that can be reached by moving elements of the robot, in particular including the end element, with the full complement of all axis movements, for example. In particular, the movement space takes into consideration for example a specific form of the end effector and/or of a handling object that are able to be achieved in particular with these in the work environment.

A "workspace", in particular of a robot, can be understood within the context of the embodiments of the invention to mean for example a space that is formed in particular by the interfaces and/or axes of movement and/or an end effector by virtue of all main axes being put into their respective maximum and minimum positions, for example. In particular, the workspace is defined independently of the specific form of the end effector and/or of the handling object (or these aspects are ignored in the workspace). Preferably, the movement space is at least as large as the workspace, the movement space also being able to be larger than the workspace.

A "pose" can be understood within the context of the embodiments of the invention to mean a spatial orientation, for example, the pose in particular denoting a combination of position and orientation of an object in space. In particular, the pose is the combination of position and orientation in three-dimensional space. By way of example, the position of a punctiform mass in relation to a cartesian coordinate system is accordingly defined by the distances along the coordinate directions x, y, z, for example. If a second cartesian coordinate system is generated at this mass point, for example, then in particular the orientation of this coordinate cross is defined by the angular offset of its coordinate axes, in particular in relation to the corresponding axes of the basic coordinate system, for example. Therefore, there are in particular additionally three angles necessary that describe the orientation of the new coordinate system relative to the basic coordinate system, for example.

A "moving axis" can be understood within the context of the embodiments of the invention to mean a kinematic axis of the machine tool or of a component of the machine tool, for example. In particular, a machine tool can be a robot, for example, the machine tool being constructed from moving limbs (arm parts), for example. In particular, the limbs form an open kinematic chain or parallel kinematics. By way of example, the kinematic chain involves each arm part of the machine tool being mounted on the preceding arm part of the machine tool by means of a moving articulation. In particular, a moving axis can be understood to mean an articulation by means of which the limbs are connected to one another, for example. In particular, the end element can be connected to the machine tool via a moving axis, in particular an articulation, for example. Preferably, a moving axis is not understood to mean an axis produced as a result of a tool being driven (e.g. a rotary movement of a drill), for example.

An "end element" can be understood within the context of the embodiments of the invention to mean an end effector, a tool spindle or a tool holder of a machine tool, for example, which are preferably a final or penultimate element of a kinematic chain of the machine tool. In particular, an end element can also be a surgical instrument and/or radiological instrument and/or medical instrument, for example, such as syringes, probes, implants, tubes or the like, for example.

A "machine tool" can be understood within the context of the embodiments of the invention to mean, by way of example, machines for producing workpieces using tools, for example robots, industrial robots or medical robots. In particular, the machine tool can also be an assisted medical robot that can be employed for assisting doctors, for example. In particular, the end element is thus used to allow, by way of example, holding and/or guiding and/or supplying, for example of surgical and/or radiological instruments and/or medical instruments, such as syringes, probes, implants, tubes or the like, for example. This in particular permits a workpiece, for example in the form of a stipulated region in or on the body of a patient, to be found reliably and the doctor to be relieved of routine activities, for example.

A "workpiece" can be understood within the context of the embodiments of the invention to mean, by way of example, a piece of metal to be machined, an electronic component or, in the broader sense, also a patient being looked after by a medical robot, for example.

The method according to the embodiments of the invention is advantageous in particular for the purpose of using the first correction value to actuate the machine tool such that in particular a difference between the first relative pose and the reference pose is minimized or as minimal as possible. Therefore, in particular the first relative pose is corrected such that in particular undesirable differences when working on the workpiece remain within prescribed tolerance ranges or are prevented as completely as possible, for example.

In particular, the use of an image-based method (in particular also denotable as an optical method) for directly determining the first relative pose between the end element, for example a tool spindle, and the workpiece allows in particular the measuring system costs to be significantly lowered.

In particular, in comparison with conventional methods, not only the kinematic deflections of the individual axes but also in particular geometric differences in the structural parts can be detected, for example. By way of example, the image-based or optical measuring system can be both incorporated into a control loop, for example during operation of the machine tool, and in particular used for calibrating offline compensation mechanisms, for example when the machine tool is serviced by an engineer.

The method is advantageous in particular for the purpose of meeting the constantly rising demands on the speed and energy efficacy of machine tools.

In particular, the method according to the embodiments of the invention permits machine tools to be provided in which in particular the moving masses are much smaller than in the case of conventional machine tools, the machine tools nevertheless achieving a high level of precision for working on workpieces. In particular, disadvantages that arise in the design of machine tools having small moving masses can be compensated for. One known disadvantage is in particular a higher level of flexibility in the components. This flexibility leads in particular to positioning errors that cannot be compensated for and hence to geometric differences when working on the workpiece. The method according to the embodiments of the invention permits larger movements of the machine structure, for example, since these can be detected and compensated for by control measures. The method according to the embodiments of the invention can in particular be used to produce highly dynamic lightweight machine tools.

In a first embodiment of the method, the multiple optical markers are detected by the optical measuring system using a camera system.

The method is advantageous in particular for the purpose of detecting the spatial positions of the optical markers or a position of a tool in the end element, for example. To this end, the camera system can in particular comprise at least one first camera module and/or a second camera module. The optical measuring system, for example the camera system, in particular the first camera system and/or the second camera system, can be firmly connected to the end element by means of retaining elements or firmly connected by means of retaining elements on a stand in the work environment, for example. In particular, the camera system can be immovably and fixedly mounted on the end element by means of the retaining elements. The camera system is preferably positioned such that it can optically detect multiple optical markers and/or the end element and/or the tool.

Therefore, in particular attachment of the optical measuring system to the end element or to the housing of the end element is conceivable, with in particular the optical markers being mounted in the work environment of the machine tool and/or on components of the machine tool. By way of example, it is also conceivable for some of the components of the machine tool, for example the end element, to be replaced for certain work steps, for example. In this case, by way of example, the optical measuring system can be mounted on components of the machine tool that are not for replacement/remain, for example the clamping surface of the machine tool. In this case, the optical markers can be mounted on the end element (or the end elements) or the housing thereof, for example.

In further embodiments of the method, the optical markers are arranged on components of the machine tool and/or on the workpiece.

The method is advantageous in particular for the purpose of detecting the position of the workpiece and/or components relative to the end element. The components of the machine tool can in particular comprise a clamping means for the workpiece and/or a clamping table of the machine tool and/or a clamping surface of the machine tool and/or a machine structure of the machine tool.

In further embodiments of the method, at least three optical markers from the multiple optical markers are fitted to one of the components of the machine tool or to the workpiece.

The method is advantageous in particular for the purpose of detecting the position of the workpiece and/or of the components with as high a precision as possible. In particular, to this end at least three optical markers of a component or of the workpiece are detected by the optical measuring system when the multiple optical markers are detected.

In further embodiments of the method, first spatial positions are ascertained on the basis of the optical markers in the work environment. Also, second spatial positions are ascertained for the end element, the second spatial positions and/or the first spatial positions being taken into consideration for ascertaining the first spatial pose.

The method is advantageous in particular for the purpose of detecting the position of the workpiece and/or of the components with as high a precision as possible. By way of example, the second spatial positions can be known positions of the optical measuring system. In particular, the second spatial positions can also be ascertained by the optical measuring system by virtue of the optical measuring system comprising an orientation module for position determination, for example, and the second spatial positions being read as required. In particular, the second spatial positions can also be ascertained by the optical measuring system by virtue of the optical measuring system determining a tool position, for example, in particular by means of optical detection. To this end, further optical markers can be fitted to a tool holder in which in particular the tool is held, for example.

In further embodiments of the method, the workpiece and the detected optical markers have a first moving axis between them, wherein position information is ascertained by a first axis-internal sensor module, said position information being taken into consideration for ascertaining the first relative pose.

The method is advantageous in particular for the purpose of detecting the position of the workpiece and/or of the components with as high a precision as possible, in particular in situations in which direct visual detection, in particular also spatial position determination, of the workpiece is not possible, for example. This can be the case, by way of example, if the workpiece is partially concealed by the tool of the end element in work steps such that in particular the optical markers of the workpiece cannot be detected by the optical measuring system. It may also be that no optical markers can be fitted to workpieces, for example, since the workpiece is particularly hot, for example.

In a further embodiment of the method, control of the end element results in a second moving axis being controlled, by means of which the end element is arranged on the machine tool.

The method is advantageous in particular for the purpose of in particular correction of the first relative pose, that is to say so that the first relative pose corresponds to the reference pose in particular as far as possible, being performed as simply as possible. In particular in the case of an industrial robot, it would be possible to take into consideration the first correction value for each articulation, for example. In particular, this is relatively complex, since a relatively complex movement model of the industrial robot often needs to be recalculated, for example. The method according to the embodiments of the invention in this embodiment in particular allows the first correction value to be taken into consideration in particular only for the (second) moving axis and therefore in particular allows a complex model calculation to be dispensed with.

In further embodiments of the method, the optical measuring system is firmly connected to the end element.

The method is advantageous in particular for the purpose of preventing an undesirable change of position of the optical measuring system. To this end, the measuring system is preferably immovably and/or fixedly connected to the end element.

In further embodiments of the method, the end element is firmly connected to the tool or a tool is connected to the end element via a third moving axis, the third moving axis in particular moving in one direction.

The method is advantageous in particular for the purpose of compensating for, by way of example, inaccuracies that arise between the end element and the tool, for example. To this end, by way of example, a simplified model of the end element and of the tool can be calculated that takes into consideration the inaccuracies or differences from a reference position or a further reference pose in order to compensate for these inaccuracies, in particular. By way of example, the differences or inaccuracies can likewise be ascertained by the optical measuring system, in particular using additional optical markers, or by a further sensor module in the end element, for example in a tool holder for the tool. The simplified model, for example a movement model of an industrial robot, is simplified by way of example to the effect that by way of example the third moving axis preferably moves only in one direction and hence by way of example relatively simple movements are modeled.

In further embodiments of the method, the optical measuring system is used to capture first geometry values of the workpiece after conclusion of the working on the workpiece by the machine tool, wherein a second correction value is calculated on the basis of the first geometry values and prescribed geometry values and the second correction value is taken into consideration for ascertaining the first correction value for a next workpiece.

The method is advantageous in particular for the purpose of increasing precision when working on the workpiece. In particular, this measurement involves higher-order geometric features being detected in a measurement cycle, as a result of which a substantially higher measurement speed can be obtained by way of example in comparison with the sensing of individual points. In particular, the measurement can be performed for each workpiece, after a prescribed number of finished workpieces or at prescribed times.

In further embodiments of the method, the first correction value is used to control the machine tool and/or the end element such that the workpiece approached is a stipulated region in or on the body of a patient.

The method is advantageous in particular for the purpose of finding or approaching in particular a workpiece, for example a workpiece as a stipulated region in or on the body of a patient, reliably with the terminal and relieving the doctor of routine activities, for example. In such a scenario, the first correction value and/or the second correction value are ascertained as continuously as possible, e.g. in predetermined time intervals that are preferably as short as possible, for example in order to take into consideration movements of the patient and in particular to point out to a doctor, for example on a display unit, that by way of example the position of the patient has changed. This can be of significant importance by way of example for operations in which in particular small differences lead to undesirable effects, e.g. injuries to nerves that in particular lead to paralysis.

According to a further aspect, the embodiments of the invention relates to a control apparatus for the computer-aided control of a/the end element of a machine tool, having:
an optical measuring system for detecting (the) multiple optical markers in a work environment of the machine tool;
a first calculation module for
ascertaining a first relative pose between the end element and a workpiece on the basis of the multiple detected optical markers;
ascertaining a first correction value on the basis of a comparison of the first relative pose with a reference pose;
a first control module for controlling the end element for working on the workpiece taking into consideration the first correction value.

In further embodiments of the control apparatus, the control apparatus comprises at least one further module or multiple modules configured for performing one of the embodiments of the method according to the embodiments of the invention.

According to a further aspect, the embodiments of the invention relates to a machine tool, having:
an end element controllable on a computer-aided basis;
multiple optical markers;
an optical measuring system for detecting multiple optical markers in a work environment of the machine tool;
a control apparatus according to the embodiments of the invention for the computer-aided control of the end element of a machine tool.

In a first embodiment of the machine tool, the optical measuring system comprises a camera system for detecting the multiple optical markers.

The machine tool is advantageous in particular for the purpose of detecting the spatial positions of the optical markers or a position of a tool in the end element, for example. To this end, the camera system can in particular comprise at least a first camera module and/or a second camera module. The optical measuring system, for example the camera system, in particular the first camera system and/or the second camera system, can be firmly connected to the end element by means of retaining elements or firmly connected by means of retaining elements on a stand in the work environment, for example. In particular, the camera system can be immovably and fixedly mounted on the end element by means of the retaining elements. The camera system is preferably positioned such that it can optically detect multiple optical markers and/or the end element and/or the tool.

In further embodiments of the machine tool, the optical measuring system is firmly connected to the end element.

In further embodiments of the machine tool, the end element is firmly connected to a tool or the tool is connected to the end element via a third moving axis, the third moving axis in particular moving in one direction.

In further embodiments of the machine tool, the machine tool comprises at least one further module or multiple modules configured for performing one of the embodiments of the method according to the embodiments of the invention.

In addition, a computer program product (non-transitory computer readable storage medium having instructions, which when executed by a processor, perform actions) having program instructions for performing said methods according to the embodiments of the invention is claimed, wherein the computer program product is able to be used to perform the respective method according to the embodiments of the invention.

Additionally, a variant of the computer program product having program instructions for configuring a construction device, for example a 3D printer or a for constructing processors and/or devices, is claimed, wherein the construction device is configured using the program instructions such that said machine tool and/or control apparatus according to the embodiments of the invention is constructed.

Furthermore, a provision apparatus for storing and/or providing the computer program product is claimed. The provision apparatus is by way of example a data storage medium that stores and/or provides the computer program product. Alternatively and/or additionally, the provision apparatus is by way of example a network service, a computer system, a server system, in particular a distributed computer system, a cloud-based computer system and/or virtual computer system that stores and/or provides the computer program product preferably in the form of a data stream.

This provision is effected by way of example as a download in the form of a program data block and/or instruction data block, preferably as a file, in particular as a download file, or as a data stream, in particular as a download data stream, of the complete computer program product. However, this provision can by way of example also be effected as a partial download that consists of multiple parts and in particular is downloaded via a peer-to-peer network or provided as a data stream. Such a computer program product is read into a system by using the provision apparatus in the form of the data storage medium, for example, and executes the program instructions, so that the method according to the embodiments of the invention is executed on a computer, or configures the construction device such that it constructs the machine tool and/or control apparatus according to the embodiments of the invention.

BRIEF DESCRIPTION

Some of the embodiments will be described in detail, with reference to the following figures, wherein like designations denote like members, wherein.

DETAILED DESCRIPTION

In the figures, elements having the same function are provided with the same reference signs, unless indicated otherwise.

Unless indicated otherwise or already indicated, the exemplary embodiments that follow have at least one processor and/or a memory device in order to implement or carry out the method.

Figure 1:
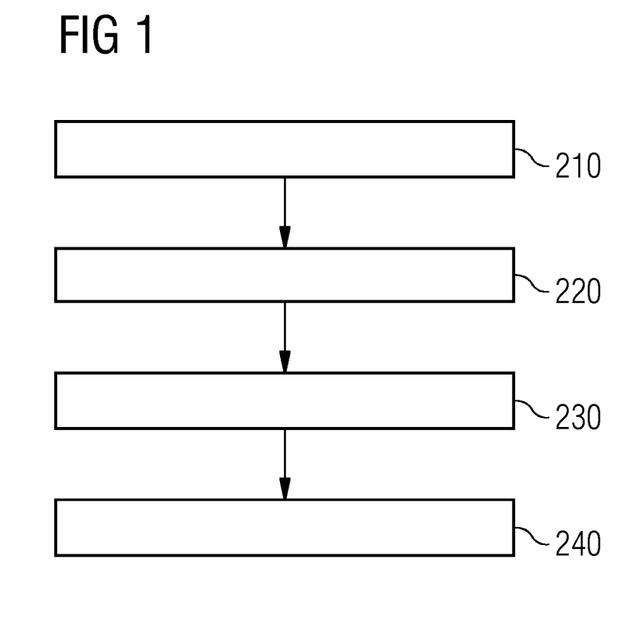
FIG. 1 shows a flowchart for a first exemplary embodiment of the method according to the embodiments of the invention.

FIG. 1 shows a flowchart for a first exemplary embodiment of the method according to the embodiments of the invention.

Specifically, FIG. 1 shows a method for the computer-aided control of an end element of a machine tool having a first method step 210 for detecting multiple optical markers in a work environment of the machine tool by means of an optical measuring system.

The method comprises a second method step 220 for ascertaining a first relative pose between the end element and a workpiece on the basis of the multiple detected optical markers.

The method comprises a third method step 230 for ascertaining a first correction value on the basis of a comparison of the first relative pose with a reference pose.

The method comprises a fourth method step 240 for controlling the end element for working on the workpiece taking into consideration the first correction value.

In a further preferred variant, a processor is configured specifically to execute the program instructions so that the processor performs functions in order to implement the method according to the embodiments of the invention or at least one of the steps of the method according to the embodiments of the invention.

Figure 2:
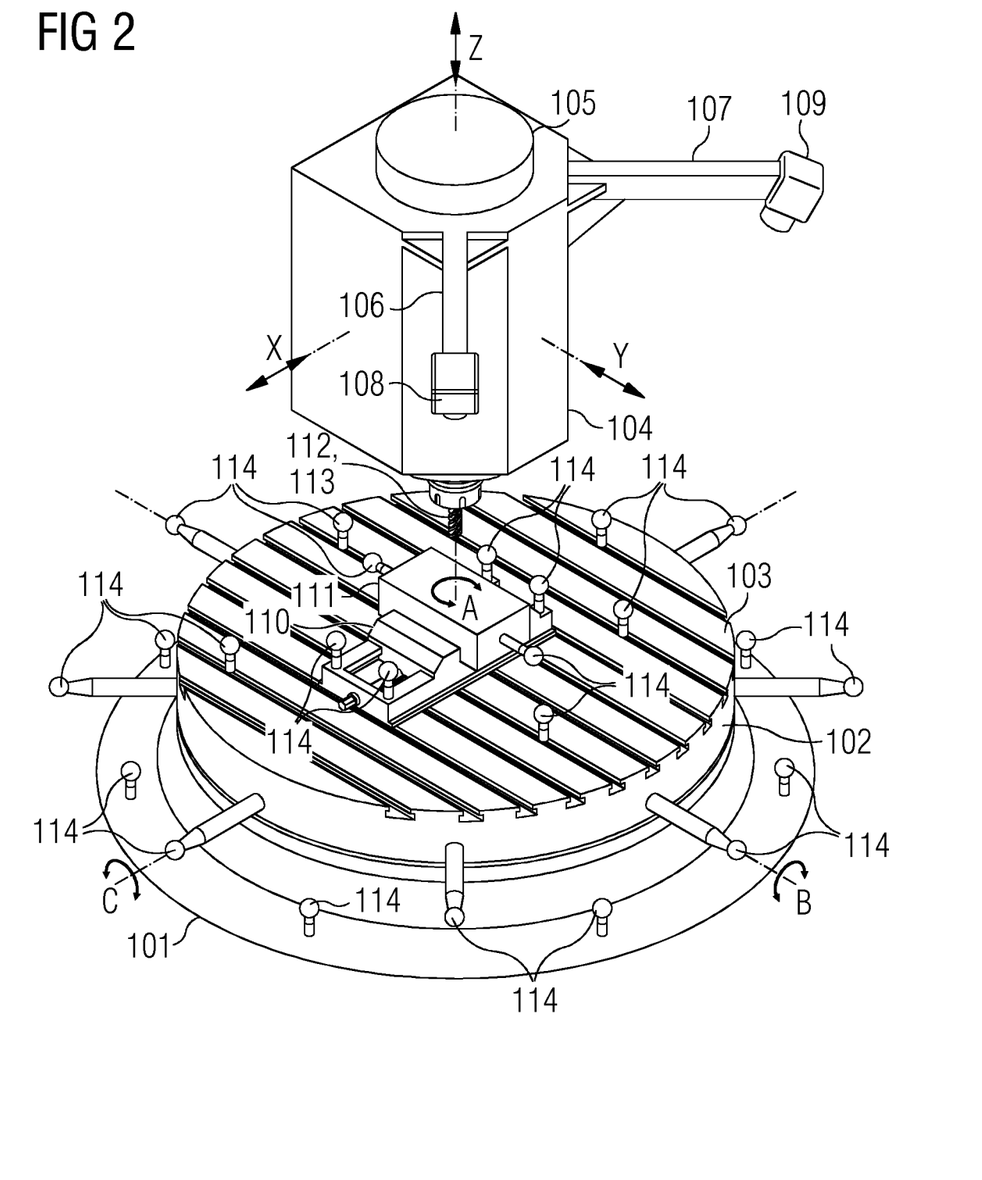
FIG. 2 shows a further exemplary embodiment of a machine tool according to the embodiments of the invention.

FIG. 2 shows a further exemplary embodiment of a machine tool according to the embodiments of the invention.

Specifically, FIG. 2 shows a machine tool having at least three controllable degrees of freedom.

The machine tool comprises multiple components, for example a (camera-based) optical measuring system, a structural part 101, a (moving) clamping table 102, a clamping surface 103, an end element, a first camera holder 106, a second camera holder 107, clamping means 110 for fixing a workpiece 111, a tool holder 112 and a tool 113. Additionally, a multiplicity of optical markers 114 are fitted to the components of the machine tool or to the workpiece 111. The end element comprises a tool spindle housing 104 and/or a tool spindle 105.

The machine tool can additionally also comprise a further component or multiple further components, for example, such as a processor, a memory unit, an input device, in particular a computer keyboard or a computer mouse, or a monitor, for example.

Kinematics of the machine tool allow relative translations along the X, Y and Z axes and optionally a rotation about the A, B and C axes. An indirect, preferably axis-integrated, measurement of the first relative pose between the tool 113 and the workpiece 111 is preferably replaced or complemented by the optical measuring system, with the optical measuring system ascertaining the first relative pose directly. The optical measuring system comprises at least two digital camera modules, for example a first camera module 108 and a second camera module 109.

The first camera module 108 is connected to the end element of the machine tool, for example to the tool spindle 105 or the tool spindle housing 104, for example via a first retaining means, for example the first camera holder 106.

The second camera module 109 is connected to the end element of the machine tool, for example to the tool spindle 105 or the tool spindle housing 104, for example via a second retaining means, for example the second camera holder 107.

The tool spindle 105 comprises the tool holder 112 in order to hold a tool 113. The camera modules 108, 109 and the tool 113 preferably have no further moving axes between them apart from the tool spindle 105.

The workpiece 111 is fixed or mounted on the clamping surface 103 for example via the clamping means 110, for example a vice. The clamping table 102 can be connected to the machine structure 101 via further moving axes.

The work environment of the machine tool and the adjoining regions have optical markers 114 distributed in them. The optical markers can in this case be fitted directly to the workpiece 111, to the clamping means 110, to the clamping surface 103, to the clamping table 102 and to the machine structure 101.

To determine the relative pose between the workpiece 111 or the end element and the tool 113, preferably at least three optical markers, which are fitted to the same component of the machine tool or to the workpiece 111, are in the field of view of the at least two camera modules 108, 109. If for example the measured optical markers 114 and the workpiece 111 have first moving axes between them, an axis-integrated sensor module of these axes is used as well to ascertain the first relative pose between the workpiece 111 and the tool 113 or the end element.

In a variant, the approach described can be complemented by further sensors, for example by vibration sensors, which are arranged on the tool spindle housing 104, for example. As a result of fusion of the different sensor data, for example of vibration sensor data of the vibration sensors with optical sensor data, of the optical markers detected by the optical measuring system, it is in particular also possible for high-frequency vibrations to be easily detected and accordingly used to increase work accuracy.

Figure 3:
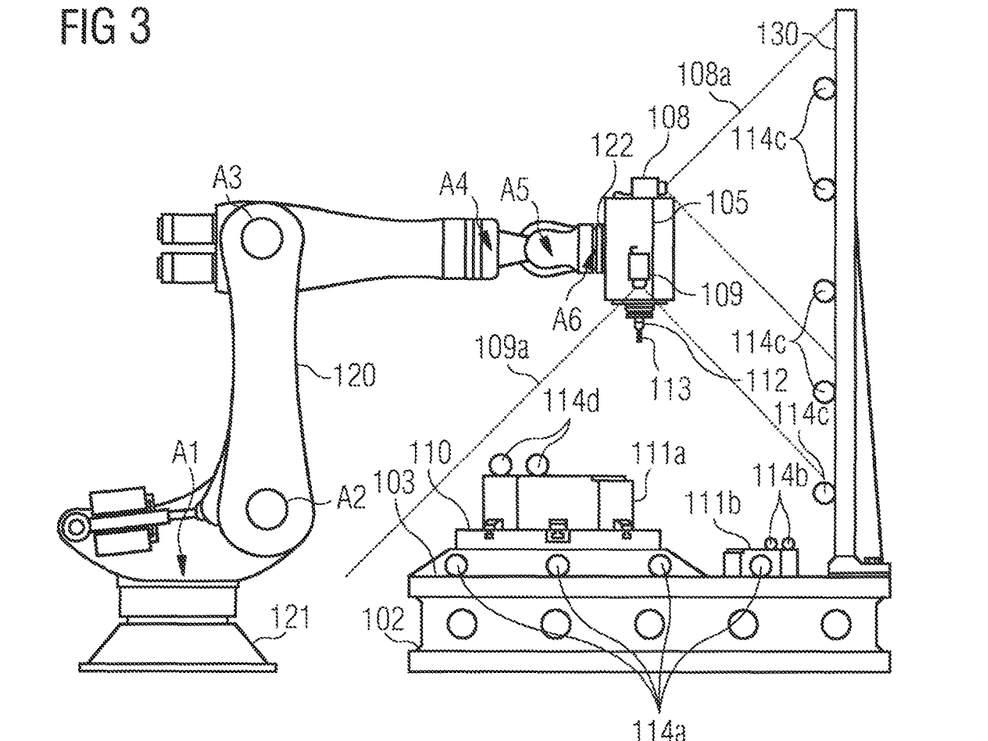
FIG. 3 shows a further exemplary embodiment of a machine tool according to the embodiments of the invention.

FIG. 3 shows a further exemplary embodiment of a machine tool according to the embodiments of the invention.

Specifically, FIG. 3 shows an industrial robot system. The industrial robot system comprises multiple components. The components are for example a robot 120, an end element, an optical measuring system, a clamping table 102, a clamping surface 103, a clamping means 110, a tool holder 112, a milling tool 113, a base frame 121 of the robot 120, a robot flange 122 on the end element and a fixed accessory 130 of the clamping table 102. Additionally, a multiplicity of optical markers 114a, 114c are fitted to the components of the machine tool and/or a multiplicity of optical markers 114d are fitted to a fixed workpiece 111a and/or a multiplicity of optical markers 114b are fitted to a moving workpiece 111b. The end element comprises a tool spindle housing and/or a tool spindle 105. The robot 120 comprises multiple moving axes, for example a second moving axis A2, a fourth moving axis A4, a fifth moving axis A5, a sixth moving axis A6, a seventh moving axis A7 and an eighth moving axis A8. The end element is mounted on the robot by means of the robot flange 122 and the second moving axis A2.

The industrial robot system can for example additionally also comprise a further component or multiple further components, such as a processor, a memory unit, an input device, in particular a computer keyboard or a computer mouse, or a monitor, for example.

The optical measuring system in this exemplary embodiment consists of a first camera module 108 having a first field of view 108*a* and a second camera module 109 having a second field of view 108*b*, which are firmly and immovably fixed to the end element, for example to the tool spindle housing.

The tool spindle 105 comprises the tool holder 112 in order to hold a tool 113. The camera modules 108, 109 and the tool 113 preferably have no further moving axes between them apart from the tool spindle 105.

The fixed workpiece 111*a* is fixed or mounted on the clamping surface 103 for example via the clamping means 110, for example a vice.

The work environment of the machine tool and the adjoining regions have the optical markers 114*a*, 114*b*, 114*c*, 114*d* distributed in them. The optical markers 114*a*, 114*b*, 114*c*, 114*d* can in this case be fitted directly to the fixed workpiece 111*a* and/or to the moving workpiece 111*b* and/or to the clamping means 110 and/or to the clamping surface 103 and/or to the clamping table 102 and/or to the fixed part 130.

To determine the first relative pose between the workpiece, for example the fixed workpiece 111*a* or the moving workpiece 111*b*, and the end element or the tool 113, preferably at least three optical markers, which are fitted to the same component of the machine tool or to the workpiece 111*a*, 111*b*, are in the field of view of the at least two camera modules 108, 109. If for example the measured optical markers 114 and the workpiece 111*a*, 111*b* have first moving axes between them, an axis-integrated sensor module of these axes is used as well to ascertain the first relative pose between the workpiece 111 and the tool 113 or the end element.

In a variant, the approach described can be complemented by further sensors, for example by vibration sensors, which are arranged on the tool spindle housing 104, for example. As a result of fusion of the difference sensor data, for example of vibration sensor data of the vibration sensors with optical sensor data of the optical markers detected by the optical measuring system, it is in particular also possible for high-frequency vibrations to be easily detected and accordingly used to increase work accuracy.

Figure 4:
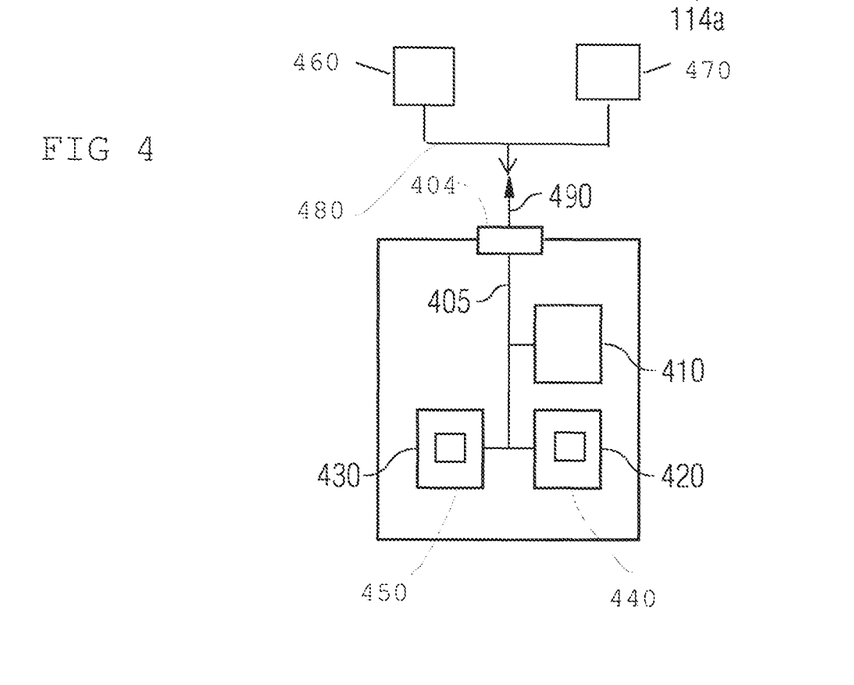
FIG. 4 shows a further exemplary embodiment of a control apparatus according to the embodiments of the invention.

FIG. 4 shows a further exemplary embodiment of a control apparatus according to the embodiments of the invention.

Specifically, FIG. 4 shows a control apparatus for the computer-aided control of a/the end element of a machine tool.

The control apparatus has an optical measuring system 410, a first calculation module 420 having a calculation processor/memory unit 440, a first control module 430 having a control processor/memory unit 450, and an optional first communication interface 404, which are communicatively connected to one another via a first bus 405. The first communication interface is connected for example to a machine tool via a communication bus. The control apparatus receives information related to a first work piece 460, and a next work piece 470, including first geometric values 480 of the first work piece 460. The control apparatus provides correction values, including a first correction value on the basis of a comparison of the first relative pose with a reference pose, and a second correction value 490 calculated based on geometric values of a workpiece and predetermined geometric values.

The control apparatus can for example additionally also comprise a further component or multiple further components, such as a processor, a memory unit, an input device, in particular a computer keyboard or a computer mouse, or a monitor, for example. The applicable component(s) can be communicatively connected to the other modules of the control apparatus for example via the first bus 405.

The optical measuring system 410 is configured for detecting (the) multiple optical markers in a work environment of the machine tool.

The optical measuring system 410 can be implemented for example by means of the processor, the memory unit, one or more camera modules and a first program component, which, for example by executing program instructions, actuate the one or more camera modules such that the optical markers are detected.

The first calculation module 420 is configured for ascertaining a first relative pose between the end element and a workpiece on the basis of the multiple detected optical markers. Additionally, the first calculation module 420 is configured for ascertaining a first correction value on the basis of a comparison of the first relative pose with a reference pose.

The first calculation module 420 can be implemented for example by means of the processor, the memory unit and a second program component, which, for example by executing program instructions, ascertain the relative pose and/or the first correction value.

The first control module 430 is configured for controlling the end element for working on the workpiece taking into consideration the first correction value.

The first control module 430 can be implemented for example by means of the processor, the memory unit and a third program component, which, for example by executing program instructions, actuate the end element taking into consideration the first correction value.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for the computer-aided control of an end element of a machine tool, the method comprising:
   detecting multiple optical markers in a work environment of the machine tool by an optical measuring system, wherein the optical markers are physical objects disposed in the work environment;
   ascertaining first spatial positions of the multiple optical markers;
   ascertaining a second spatial position of the end element;
   ascertaining a first relative pose between the end element and a workpiece on the basis of the multiple optical markers and taking into account the first spatial positions and the second spatial position, wherein the first relative pose denotes a combination of position and orientation of the end element in space;
   ascertaining a first correction value on the basis of a comparison of the first relative pose with a reference pose; and controlling the end element for working on the workpiece taking into consideration the first correction value, wherein:

the optical measuring system is used to capture first geometry values of the workpiece after conclusion of the working on the workpiece by the machine tool, a second correction value is calculated based on the first geometric values and predetermined geometric values, and the second correction value is taken into account when determining the first correction value for a next work piece.

2. The method as claimed in claim 1, wherein the multiple optical markers are detected by the optical measuring system using a camera system.

3. The method as claimed in claim 1, wherein the multiple optical markers are arranged on components of the machine tool and/or on the workpiece.

4. The method as claimed in claim 1, wherein at least three optical markers from the multiple optical markers are fitted to one of the components of the machine tool or to the workpiece.

5. The method as claimed in claim 1, wherein the workpiece and the multiple optical markers have a first moving axis between the workpiece and the multiple optical markers, position information is ascertained by a first axis-internal sensor module, the position information being taken into consideration for ascertaining the first relative pose.

6. The method as claimed in claim 1, wherein control of the end element results in a second moving axis being controlled, by means of which the end element is arranged on the machine tool.

7. The method as claimed in claim 1, wherein the optical measuring system is connected to the end element.

8. The method as claimed in claim 7, wherein the end element is connected to the tool or the tool is connected to the end element via a third moving axis, the third moving axis in particular moving in one direction.

9. The method as claimed in claim 1, wherein the first correction value is used to control the machine tool and/or the end element such that the workpiece approached is a stipulated region in or on the body of a patient.

10. A control apparatus for the computer-aided control of an end element of a machine tool, comprising:

an optical measuring system for detecting multiple optical markers in a work environment of the machine tool, wherein the optical markers are physical objects disposed in the work environment;

a first calculation processor or memory unit for storing program instructions configured for ascertaining first spatial positions of the multiple optical markers;

ascertaining a second spatial position of the end element;

ascertaining a first relative pose between the end element and a workpiece on the basis of the multiple optical markers and taking into account the first spatial positions and the second spatial position, wherein the first relative pose denotes a combination of position and orientation of the end element in space;

ascertaining a first correction value on the basis of a comparison of the first relative pose with a reference pose; and a first control processor or memory unit for storing program instructions configured for controlling the end element for working on the workpiece taking into consideration the first correction value, wherein the optical measuring system is configured to capture first geometry values of the workpiece after conclusion of the working on the workpiece by the machine tool, wherein the first calculation or processor or memory unit for storing program instructions is configured to calculate a second correction value based on the first geometric values and predetermined geometric values, and wherein the first calculation or processor or memory unit for storing program instructions is configured to take into account the second correction value when determining the first correction value for a next work piece.

11. A machine tool, comprising:
an end element controllable on a computer-aided basis;
multiple optical markers;
a control apparatus as claimed in claim 10.

12. The machine tool as claimed in claim 11, wherein the optical measuring system comprises a camera system for detecting the multiple optical markers.

13. The machine tool as claimed in claim 11, wherein the optical measuring system is connected to the end element.

14. The machine tool as claimed in claim 11, wherein the end element is connected to a tool or the tool is connected to the end element via a third moving axis, the third moving axis in particular moving in one direction.

15. A computer program product, comprising a computer readable hardware storage device having a computer readable program code stored therein, said program code executable by a processor of a computer system to implement a method having program instructions for performing the method as claimed in claim 1.

16. A computer program product, comprising a computer readable hardware storage device having a computer readable program code stored therein, said program code executable by a processor of a computer system to construct the control apparatus as claimed in claim 10.

17. A provision apparatus for the computer program product as claimed in claim 15, wherein the provision apparatus for the computer program product as claimed in claim 15 stores and/or provides the computer program product as claimed in claim 15.

18. The method as claimed in claim 1, wherein the optical markers are disposed across three dimensions in the work environment.

19. The machine tool as claimed in claim 11, wherein the optical markers are disposed across three dimensions in the work environment.

* * * * *